3,088,941
PROCESS FOR THE PREPARATION OF IMPROVED POLYTETRAFLUOROETHYLENE EXTRUSION POWDER
Keith Leon Uhland, Wilmington, Del., assignor to E. I. du Pont de Nemours and Company, Wilmington, Del., a corporation of Delaware
No Drawing. Filed Mar. 11, 1960, Ser. No. 14,187
5 Claims. (Cl. 260—92.1)

The process of the present invention relates to the preparation of aqueous dispersions of polytetrafluoroethylene, and, more particularly, to the preparation of polytetrafluoroethylene extrusion powder.

It is well known that polytetrafluoroethylene is difficult to fabricate into various shapes by techniques applicable to most plastics. Although polytetrafluoroethylene has a crystalline melting point at 327° C., above which the polymer powder can be coalesced and sintered into continuous shapes, it does not become fluid and deformable as the usual crystalline thermoplastic polymers do above their crystalline melting points, but retains its shape and forms a brittle gel which can only be worked with difficulty. Consequently, special extrusion techniques were developed for polytetrafluoroethylene in which the powder is formed into the desired shape which is subsequently sintered and coalesced. One method of extruding polytetrafluoroethylene involves prebaking finely divided polymer and then passing the polymer through a die having the size and shape of the desired finished article and sintering the article while passing through the die. A greatly improved method was developed when it was discovered that tetrafluoroethylene could be polymerized in an aqueous medium to give rise to a dispersion of polytetrafluoroethylene. The dispersion is coagulated, the coagulated polymer is dried and is then combined with a liquid hydrocarbon lubricant. The lubricated polymer is then passed under pressure through a die having the size and shape of the desired article under conditions such that the lubricant is not volatilized. The resulting preform is dried to remove the lubricant and thereafter heated to a temperature above 327° C. to sinter the polymer into the final shape. In contrast to previously obtained polymers, polymer obtained on coagulation of aqueous dispersions gives rise at high and uniform extrusion rates to an extruded, unsintered preform having great strength and toughness which can be sintered to impermeable flawless articles. This method of extruding polytetrafluoroethylene generally called "paste extrusion" is described in greater detail in U.S. Patent 2,685,707, issued to W. E. Llewellyn and J. F. Lontz on August 10, 1954. However, it had been found that the extrudability and the quality of the extrudate varied significantly from one polymerization to the next and that some polymerizations gave rise to polymers which were relatively unsuited for the extrusion of polytetrafluoroethylenes in that they could not be extruded at even rates and on sintering formed extrudates which were cracked and of uneven strength causing early failure.

It is, therefore, one of the objectives of the present invention to provide an improved polytetrafluoroethylene extrusion powder. It is another object to provide a process for reproducibly preparing a polytetrafluoroethylene powder suitable for extrusion. It is yet another object to provide an improved polymerization process for tetrafluoroethylene. It is still a further object of the present invention to provide a process for the polymerization of tetrafluoroethylene to an aqueous polymer dispersion wherein the polymerization is controlled to give rise to polymers suitable for paste extrusion. Other objects will become apparent hereinafter.

The objects of the present invention are accomplished by a process which comprises introducing, at a temperature of below 100° C., tetrafluoroethylene into an aqueous medium containing a water-soluble, free radical forming initiator, a dispersing agent and from 0.1 to 1% by weight of the aqueous medium of colloidal polytetrafluoroethylene dispersed in water, subjecting the resulting aqueous dispersion formed by polymerization to agitation until coagulation occurs, and recovering a polytetrafluoroethylene powder. In accordance with the present invention it was discovered that the presence of colloidal polytetrafluoroethylene in the aqueous medium prior to initiation will cause the formation of an aqueous polytetrafluoroethylene dispersion which on coagulation gives rise to an improved extrusion powder. The presence of the colloidal polytetrafluoroethylene is believed to cause the formation of colloidally dispersed polymer of larger particle size. The polytetrafluoroethylene polymer obtained on coagulation of the dispersion is improved with respect to its extrusion characteristics in that it is capable of being extruded at higher rates than the unmodified polymer, and in that the extrusion is subject to less pressure variation, thus giving rise to a more uniform caliper product. The extruded product obtained on sintering, furthermore, shows less flaws and, thus, allows for more uniform fabrication.

The addition of the colloidal polytetrafluoroethylene prior to polymerization is critical with respect to the upper limit employed. If the quantity of the added polytetrafluoroethylene exceeds 1% to 2% of the aqueous medium, coagulation of the entire dispersion occurs during the polymerization. Polymer coagulated during polymerization is unsuitable for extrusion and molding. It is believed that the presence of coagulated polymer during the polymerization acts as an active surface on which further polymer growth occurs. This further polymer growth adversely changes the structure and the nature of the resulting polymer particle. Furthermore, the presence of an amount of coagulated polymer in excess of the critical maximum quantity during the polymerization tends to cause the coating of the reactor walls and the fouling of reactor lines and valves, and for that reason must be avoided.

The best results are obtained when the quantity of the colloidal polytetrafluoroethylene added corresponds to 0.2 to 1.0% by weight of the aqueous medium. The only requirement of the added polytetrafluoroethylene is that it is in colloidal form. As stated hereinabove, the colloidal polytetrafluoroethylene is added to the aqueous polymerization medium prior to addition of the monomer.

The polymerization of tetrafluoroethylene according to the present invention is otherwise carried out in accordance with known general procedures. Thus, monomer pressures of 1 to 1000 atmospheres may be employed, although it is generally preferred to employ pressures from 1 to 75 atmospheres, since otherwise expensive high pressure equipment is required to handle the monomer. The reaction temperature is maintained at a temperature ranging from 0° to about 100° C. Higher temperatures can be employed if the pressure is sufficiently high enough to maintain the reaction medium, i.e., the water, in the liquid phase. Cooling of the reaction mixture is generally required, since the polymerization is exothermic. A wide variety of free radical initiators may be employed in the present invention, particularly water soluble organic and inorganic peroxides. Preferred initiators are water soluble peroxy acids such as ammonium persulfate, disuccinic acid peroxide, among others. Redox polymerization initiators such as sodium bisulfite with ferricitrophosphates may also be employed as polymerization initiators in the present invention. The quantity of the catalyst may be varied over a wide range depending on polymerization rates and polymerization degrees desired; generally from 0.01 to 5% of initiator by weight of the aqueous medium is added.

The ratio of water to monomer in the practice of the present invention is not critical but merely a matter of choice depending upon the size of the vessel and other obvious factors. In general, the water is usually present on a weight basis in a ratio of greater than one part of water per part of monomer and preferably at least 1.5 to 10 parts of water per part of monomer.

Other components of the polymerization mixture which may be present include a dispersing agent, an initiator activating agent and an inhibitor for the formation of coagulum during polymerization. The dispersing agent used in the polymerization may be any suitable water-soluble ionizable dispersing agent which will permit the production of aqueous dispersions of colloidal polymeric tetrafluoroethylene. Some of the most desirable dispersing agents are those compounds having a solubility in water of at least 0.1% at 100° C. and comprising an ionic hydrophilic portion and a hydrophobic portion, said latter being a highly fluorinated radical containing at least 6 aliphatic carbon atoms. These dispersing agents are disclosed in U.S. Patent 2,559,752, issued to K. L. Berry. Examples of the preferred dispersing agents are those water-soluble salts from the group consisting of alkali metal, ammonium and substituted ammonium salts of a polyfluoroalkanoic acid having the general formula $B(CF_2F)_n COOH$, wherein B is from the group consisting of hydrogen and fluorine and $n$ is an integer from 6 to 20 inclusive. Specific examples include potassium hexadecafluorononanoate, ammonium eicosafluoroundecanoate, ammonium dodecafluoroheptanoate, ammonium hexadecafluorononanoate, potassium eicosafluoroundecanoate, sodium dodecafluoroheptanoate, ammonium perfluoropelargonate, sodium perfluorocaproate, ammonium perfluorocaprylate, and the like. Mixtures of two or more dispersing agents are also suitable for use in this invention. The amount of the dispersing agent used is not particularly critical and may vary, for example, from 0.01 to 10% by weight of the water used.

It is also preferred in making the more concentrated dispersion of this invention to employ one of the saturated hydrocarbons as described in U.S. Patent 2,612,484 issued to G. S. Bankoff. As pointed out in the Bankoff patent, these hydrocarbons are efficient stabilizing agents against coagulation of the polymer and permit agitation of the reactants without danger of coagulating the polymer and low concentrations. These hydrocarbon anti-coagulants also help to sequester and remove any coagulated polymer which separates from the aqueous medium. The saturated hydrocarbon compounds which are suitable for this purpose include those which have more than 12 carbon atoms and are liquid under polymerization conditions. Specific examples include octadecane, eicosane, tetradecane, cetane, mixtures of hydrocarbons commonly known as white oils and paraffin waxes, liquid at the polymerization temperature. These hydrocarbons are added to the aqueous medium before polymerization in proportions of about 0.1% to 12% by weight based on the water present.

As activator, there may be added, although such is not essential to the polymerization, a small quantity of powdered iron as described in U.S. Patent 2,750,350, issued to A. E. Kroll, June 12, 1956. The iron powder, commercally available as reduced iron powder, being essentially pure iron free from oxidation products, is stated to increase the rate of polymerization when employed in combination with peroxides. The quantity of the iron is generally less than 10 p.p.m. by weight of the water present.

The polymerization is generally continued until a 35% polymer dispersion is obtained. The polytetrafluoroethylene dispersion as obtained in the polymerization kettle is passed into a wax separator where the dispersion is cooled, to allow solidification and separation of the hydrocarbon added. The resulting dispersion is then passed into a coagulator where the colloidal polymer is diluted and then coagulated by subjecting the dispersion to agitation. The conditions employed in coagulating the polymer will determine the nature of the resulting polymer particles, which is important with respect to obtaining a free-flowing powder which can readily be fed to fabricating machines. If the polymer is coagulated with too much shearing the polymer will not flow readily. The amount of shearing is dependent on the power with which the agitator is driven. A suitable agitator power is from 0.02 to 2 horsepower per gallon of aqueous dispersion, as described in greater detail in U.S. Patent 2,593,583 issued to J. F. Lontz, April 22 1952. The coagulated powder obtained in this manner is filtered, washed and dried at a temperature of 150° C. for 11 hours.

From the dried powder a highly suitable pressure coalescing, extrusion composition is prepared by intimately admixing the polytetrafluorethylene powder with an organic lubricant having a viscosity of at least 0.45 centipoise at 25° C., said lubricant being liquid under the conditions of subsequent extrusion and present in an amount equal from 5% to 50% based on the combined weight of the polytetrafluoroethylene and lubricant. The lubricant is preferably a saturated aliphatic or cycloaliphatic hydrocarbon having the above-indicated viscosity.

In a typical extrusion, the pressure-coalescing lubricated polymer mixture is fed into the extrusion cylinder of a plastics extrusion machine. The mixture is forced under pressure through an extrusion die which is maintained at a temperature of 15° to 150° C. The lubricant in the resulting extruded article is removed either by volatilization or extraction. When substantially all of the lubricant has been removed, the extruded article is passed through a sintering oven or bath maintained at a temperature above 327° C. until all of the polymer is sintered. The sintering step coalesces the polymer particles into a strong uniform article. The sintering may be followed by quenching the polymer in water or other coolant liquids or gases to yield smooth surfaced articles, or in some cases it may be beneficial to anneal the extruded, sintered article instead of quenching it. The process of extruding polytetrafluoroethylene is described in greater detail in U.S. Patent 2,685,707 issued to W. E. Llewellyn and J. F. Lontz on August 10, 1954.

The colloidal polytetrafluoroethylene employed in the present invention comprises a high molecular weight, solid polymer of tetrafluoroethylene having a crystalline melting point at 327±2° C. and substantially no melt flow at temperatures above its melting point. The colloidal polytetrafluoroethylene particle is spheroidal in shape and has an average diameter of 0.1 to 0.5 micron. The colloidal polytetrafluoroethylene is produced by such processes as disclosed in the aforementioned U.S. Patent 2,559,752.

The invention is further illustrated, but not limited, by the following example in which proportions are by weight unless otherwise specified.

*Example*

Into a 10 gallon autoclave was charged water, 35% polytetrafluoroethylene dispersion, ammonium perfluorocaprylate, disuccinic acid peroxide, paraffin wax, iron in the quantities tabulated below. The polytetrafluoroethylene particles in the dispersion were high molecular weight polytetrafluoroethylene having a crystalline melting point of 327° C. and were prepared by the process disclosed in U.S. 2,750,350. The reaction mixture was heated to 95° C. and pressured with tetrafluoroethylene until a pressure of 400 p.s.i.g. was obtained. The reaction mixture was agitated and pressure and temperature maintained until the quantity of monomer indicated in the table had been polymerized.

The resulting product was examined as to the solids dispersed and coagulum. A 900 g. sample of the polymer was lubricated by admixing it with 19% by weight of the total composition of 2 V.M. & P. naphtha, a commercial hydrocarbon lubricant. The mixture was placed in a closed jar and rolled for a period of 30 min. at a rate of 30 r.p.m. The lubricated polymer was employed in the coating of wire in a Jennings wire extruder, Model TF–1. An E–22 U.S. military specification wire [(M–12–W–16878A/5) (Navy)] was coated with a 10 mil layer of the polytetrafluoroethylene at the rate of 25 ft./min. according to the method disclosed in the article of G. R. Snelling and R. D. de Jong in "Wire and Wire Products" of June 1957. The wire yield is the percentage of coated wire in flaw-free pieces of 50 feet or more of the total length of the wire coated.

| Polymerization Conditions and results | Run A | Run B | Run C | Run D | Run E | Run F |
|---|---|---|---|---|---|---|
| Water, Gallons | 5.17 | 5.17 | 5.17 | 5.17 | 5.17 | 4.8 |
| Polytetrafluoroethylene dispersion added on ml | 0 | 220 | 220 | 440 | 500 | 880 |
| Percent Colloidal Polytetrafluoroethylene Charged on the Basis of Aqueous charge | 0 | .5 | .5 | 1.0 | 1.15 | 3.0 |
| Ammonium Perfluorocaprylate, lb | 0.067 | 0.067 | 0.067 | 0.134 | 0.067 | 0.067 |
| Disuccinic Acid Peroxide, Gm | 14.2 | 14.2 | 14.2 | 14.2 | 14.2 | 14.2 |
| Paraffin Wax in lbs | 1.68 | 3.36 | 1.68 | 1.68 | 1.68 | 1.68 |
| Iron, gm | 0.04 | 0.04 | 0.04 | 0.04 | 0.04 | 0.04 |
| Monomer, lb | 20 | 20 | 20 | 20 | 20 | 20 |
| Percent Solids Obtained in resulting dispersion | 33 | 35 | 36 | 35 | 27 |  |
| Coagulum |  |  |  |  | (¹) | (²) |
| Wire Yield | 0 | 30–80 | 25–75 | 35–80 | 100 |  |

¹ Slightly coagulated.
² Completely coagulated.

The results of this series of polymerizations clearly shows the criticality of the amount of colloidal polytetrafluoroethylene added to the polymerization. If the quantity is significantly increased above 1% of the aqueous medium, coagulation of the polymer in the subsequent polymerization occurs.

The present invention may be used to polymerize tetrafluoroethylene by itself and may also be employed in modified tetrafluoroethylene polymerizations such as the copolymerization of tetrafluoroethylene. It may also be employed in the polymerization of tetrafluoroethylene where telomerizing agents are employed to prepare polymers of tetrafluoroethylene with modified end groups.

The primary advantage of the present invention is the improved extrusion composition obtained by the addition of colloidal polytetrafluoroethylene to the polymerization process.

The aqueous colloidal dispersions of polymeric tetrafluoroethylene obtained in accordance with this invention have many other uses in addition to preparation of an extrusion composition. They may be used for casting films, and for coating or impregnating textiles, glass fabric, ceramics, metal and wood. The powder obtained by the present invention may be employed for the molding of shaped articles. The extrusion composition may be employed for the coating of wire, extrusion of films, extrusion of pipes, rods and sheets, etc. Pigments and fillers may be added to the composition if desirable.

This application is a continuation-in-part of Serial No. 677,211, filed August 9, 1957, now abandoned.

I claim:
1. In the homopolymerization of tetrafluoroethylene at pressure of 1 to 75 atmospheres in an aqueous medium to obtain a colloidal dispersion of polytetrafluoroethylene by polymerizing said tetrafluoroethylene in said aqueous medium containing a water-soluble peroxide initiator and a water-soluble dispersing agent comprising a water-soluble salt selected from the class consisting of alkali metal salts, the ammonium salt and the substituted ammonium salts of a perfluoroalkanoic acid having the structure B(CF₂)ₙCOOH, wherein B is from the group consisting of hydrogen and fluorine and n is an integer from 6 to 20, the step which comprises adding to the aqueous medium, prior to polymerization, less than 1% by weight of the aqueous medium of colloidally dispersed, solid, high molecular weight polytetrafluoroethylene having a crystalline melting point at about 327° C. and continuing the polymerization by maintaining the polymerization pressure until a polytetrafluoroethylene concentration of about 35% by weight of the aqueous medium is obtained.

2. The process of claim 1 in which the polymerization is carried out in the presence of 0.2 to 1.0% of colloidal polytetrafluoroethylene based on the weight of the aqueous medium.

3. In the homopolymerization of tetrafluoroethylene at pressure of 1 to 75 atmospheres in an aqueous medium to obtain a colloidal dispersion of polytetrafluoroethylene, the step which comprises adding to the aqueous medium prior to addition of tetrafluoroethylene 0.2 to 1.0% by weight of the aqueous medium of colloidally dispersed, solid, high molecular weight polytetrafluoroethylene having a crystalline melting point at about 327° C., and carrying out said polymerization in said aqueous medium containing as dispersing agent a water-soluble salt of a polyfluoroalkanoic acid having the general formula $$B(CF_2)_nCOOH$$

wherein B is from the group consisting of hydrogen and fluorine and n is an integer from 6 to 20, wherein the salt is selected from the class consisting of alkali metal salts, the ammonium salt, and substituted ammonium salts, a water-soluble acid peroxide initiator, from 0.5 part to 10 parts per million of powdered iron by weight of the water, and 0.1 to 12% by weight of the water of a saturated hydrocarbon having more than 12 carbon atoms and which is liquid under the polymerization conditions, and continuing the polymerization by maintaining the polymerization pressure until a polytetrafluoroethylene concentration of about 35% by weight of the aqueous medium is obtained.

4. The process of claim 3 wherein the peroxide is disuccinic acid peroxide.

5. The process of claim 3 wherein the dispersing agent is ammonium perfluorocaprylate.

References Cited in the file of this patent

UNITED STATES PATENTS

| 2,587,562 | Wilson | Nov. 22, 1948 |
| 2,750,350 | Kroll | June 12, 1956 |

FOREIGN PATENTS

| 627,265 | Great Britain | Aug. 4, 1949 |

OTHER REFERENCES

Miller Journal of Polymer Science, vol. XI, No. 3, pages 269–276, September 1953.

UNITED STATES PATENT OFFICE
CERTIFICATE OF CORRECTION

Patent No. 3,088,941  May 7, 1963

Keith Leon Uhland

It is hereby certified that error appears in the above numbered patent requiring correction and that the said Letters Patent should read as corrected below.

Column 3, line 29, for "$B(CF_2F)_n$ COOH" read -- $B(CF_2)_n$ COOH --; columns 5 and 6, in the table, first column, line 3, for "added on ml" read -- added in ml. --; column 6, line 2, for "prior to polymerization" read -- prior to addition of tetrafluoroethylene --.

Signed and sealed this 19th day of November 1963.

(SEAL)
Attest:
ERNEST W. SWIDER
Attesting Officer

EDWIN L. REYNOLDS
Acting Commissioner of Patents